United States Patent [19]
Strejc

[11] 3,711,910
[45] Jan. 23, 1973

[54] MILLING HEAD CUTTERS

[75] Inventor: Bohuslav Strejc, Plzen, Czechoslovakia

[73] Assignee: Skoda, narodni podnik, Plzen, Czechoslovakia

[22] Filed: Nov. 18, 1971

[21] Appl. No.: 200,096

Related U.S. Application Data

[63] Continuation of Ser. No. 888,645, Dec. 29, 1969, Pat. No. 3,621,755.

[30] Foreign Application Priority Data

Dec. 29, 1968 Czechoslovakia............8880/68

[52] U.S. Cl. .................................29/105 R, 90/1
[51] Int. Cl. ..........................................B26d 1/12
[58] Field of Search.......29/95, 103 R, 103 B, 105 R, 29/105 A

[56] References Cited

UNITED STATES PATENTS

| | | | |
|---|---|---|---|
| 1,903,988 | 4/1933 | Pickett | 29/105 |
| 2,881,508 | 4/1959 | Linder | 29/105 |

FOREIGN PATENTS OR APPLICATIONS

| | | | |
|---|---|---|---|
| 1,142,008 | 3/1957 | France | 29/105 |
| 396,339 | 8/1933 | Great Britain | 29/105 |
| 420,931 | 5/1947 | Italy | 29/105 A |

*Primary Examiner*—Harrison L. Hinson
*Attorney*—Richard Low et al.

[57] ABSTRACT

A milling head for forming globoid worms, having two sets of cutting instruments. One set of cutters is fixed. The other set is removable. The cutting edges are arranged along specific axes and directions to effect cutting.

5 Claims, 2 Drawing Figures

PATENTED JAN 23 1973 3,711,910

MILLING HEAD CUTTERS

This is a continuation of Ser. No. 888,645 filed Dec. 29, 1969 now U.S. Pat. No. 3,621,755 issued Nov. 25, 1971.

BACKGROUND OF INVENTION

This invention relates to the arrangement of a multiknife milling head for the manufacture of worm wheels and particularly of globoid worm wheels.

Known manufacturing methods of globoid worm wheels use generally, multiknife milling heads with knives, the cutting edges of which are arranged in accordance with the geometric laws of the globoid helix. The knives are of equal shape and are permanently clamped in the milling head. These knives advance in the course of rough milling radially in engagement with the workpiece which is in fact the semi-product of the worm wheel, performing the rough milling with the same cutting edges as is used to subsequently finish the piece after the proper axial distance between the tool and workpiece is obtained. As a result a limited circumferential feeding motion between the tool and the workpiece is accomplished. The cutting edges at both extremities of the milling head thus become quickly worn and the required quality of the surfaces of the tooth flanks, particularly of the surfaces which are in engagement with the worm, is not achieved during the finishing operation. Consequently, not all the material is removed and metal of the thickness of several hundreth parts of a millimeter remains on these engaging surfaces, just as it does on parts which do not come into engagement. It has, therefore, been necessary to frequently sharpen the cutting edges of the multiknife milling head, reducing thus the life time of the tool and increasing its maintenance costs.

Another conventional arrangement of a milling head is described in the German Pat. specification No. 673,400 where two internal removable knives are provided in addition to permanently fixed cutting knives. The removable knives perform the finishing operations only, whereas the permanently clamped knives work in the course of the whole working process. The active cutting edges of these knives are adjusted so as to comply with the width of the tooth gap and all cutting edges are on the same helical surface as the removable knives. The finishing is performed with all knives which form the whole tooth gap and all knives are adjusted alike. The main knives are the external knives, used permanently both for roughing and finishing. A shallow engaging surface which is not worked completely is thereby created on the tooth flanks of the worm wheel. The milling head arranged in this manner only reduced the drawbacks of milling heads with all knives permanently clamped, reducing somewhat the time required for running-in the worm gear. The substantial drawback, the quick wear of cutting edges of the milling head has however, not been eliminated. The better final result of milling has been compensated for by high wear of knives on both extremities of the milling head which after only two or three milling operations have lost their life. This drawback shows up when the engaging surfaces of the finished gear do not properly work.

It is the object of the present invention to overcome the drawbacks of the prior art; to provide an improved method and apparatus for forming globoid gears, and to provide improved method and apparatus for simplifying cost and labor involved in the same.

These and, additional objects and advantages will be apparent from the following disclosure.

SUMMARY OF INVENTION

According to the present invention, a multiknife milling head is provided comprising in addition to permanently clamped knives two removable knives, arranged in the body of the multiknife milling head so that the position of their cutting edges for cutting the tooth flanks coincide at least in one point with a theoretical generating line which is perpendicular to the rotation axis of the tool, whereas parts of cutting edges of all knives of the milling head designated for milling the tooth gaps are in a position corresponding to the root circle of the worked worm wheel. The position of parts of cutting edges of the removable knives for cutting tooth flanks coincide with the theoretical position of a generating line of the worm gear corresponding to the width of the tooth of a worm having no clearance with the teeth of the worm wheel, whereas the position of similar parts of permanently clamped knives coincide with generating lines corresponding to a smaller width of the teeth of the worm.

It is furthermore, preferred that the position of the cutting edges of the removable knives for roughing the tooth flanks comply with the theoretical position of the generating line of the globoid gear, whereas the position of analogical cutting edges of the permanently clamped knives are identical with the actual dimensions of the tooth flanks of the helical surface of the worm, for which the worm wheel is manufactured.

It is further preferred to use this arrangement to create conditions, where the working of the worm wheel proceeds within two subsequent working phases, a preliminary phase and a finishing phase. The removable knives perform together with permanent knives the rough milling with parts of their cutting edges which cut the gaps between adjacent teeth up to the root circle of the worm wheel. At the end of this preliminary phase these removable knives make the rough milling of the tooth flanks with the respective parts of their cutting edges.

Full details of the present invention will be seen from the following description and the accompanying drawings.

DESCRIPTION OF THE INVENTION

Figure 1:
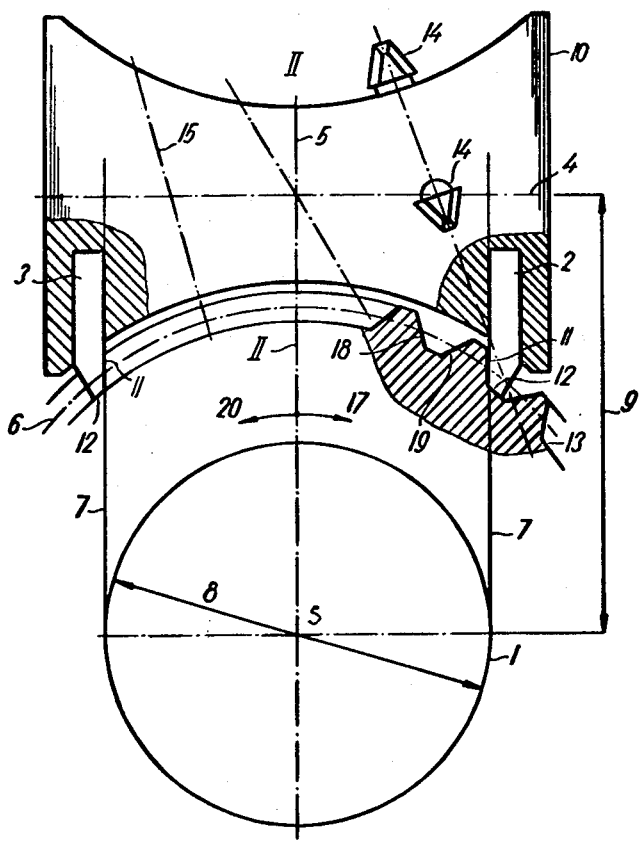
FIG. 1 is a side view of a milling head showing its construction and also schematically the basic parameters of a globoid worm gear and multiknife milling head.

The body 10 of the multiknife milling head has substantially the fundamental shape of a globoid worm. The rotational axis 4 of the body 10 of the milling head is, for the finished roughing operation located at the distance 9 from the axis of the worm wheel which axis is coincident with the center S of the generating circle 1 of the worm gear. The distance 9 is measured on a radial line 5 of the generating circle 1 perpendicular to the axis 4, and is also coincident with the proper distance of the axis of the worm and worm wheel in operation. The multiknife milling head is provided with two kinds of knives. The first kind are knives 2 and 3 and are located at the ends of the tool and are removable. They have a cutting edge 11 for roughing the tooth flanks of the worm wheel which is adjusted in dependence on the extreme position of the generating line 7 of the globoid worm gear. The generating line is a tangent to the generating circle 1 of a diameter 8 and simultaneously perpendicular to the axis 4 of the milling head. The position of the cutting edges 11 of the removable knives 2, 3 is thus determined by the generating laws of the globoid helix of the globoid worm gear in accordance with conditions corresponding for instance, to values on the pitch circle 6 of the globoid gear. It takes into account equally possible requirements which follow from multithreaded worms. That means that the position of the cutting edges for the tooth flanks corresponds to the theoretical position of the generating line and meets all the parameters of the manufactured globoid gear by their arrangement in the body of the multiknife milling head.

In conventional manner a set of permanently secured knives 14 are set in the face of the milling body 10 so that their cutting edges lie in a position corresponding to the root circle 13 of the worm wheel. This structure and arrangement is well known and therefore need not be further described.

Figure 2:
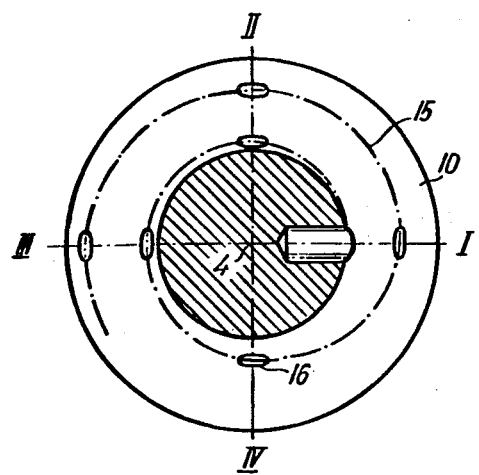
FIG. 2 is a cross section taken along the plane indicated by line 5 in FIG. 1.

The cutting edges 11 of the removable knives 2, 3 can be sharpened before insertion in or even on their removal from the body 10 of the milling head so as to maintain the correct shape and cutting angle. They are inserted into the body 10 so that the lead portions 12 of the cutting edges which cut the tooth gaps are in a position corresponding to the root circle 13 of the worm wheel, similarly as are the cutting portions of the permanently clamped knives 14. The permanently clamped knives 14 are each mounted in openings 16 in the body 10 of the multiknife milling head. These openings 16 are arranged in direct dependence on the theoretical globoid helix 15 and generally in several rows. An exemplary arrangement is indicated in FIG. 2. The permanently clamped knives 14 are supported in openings 16 of the body 10 of the milling head, whereby the axis of these knives point angularly in a direction determined by a circle of the diameter 8, which is in the plane of symmetry of the body 10 perpendicular to its axis 4, said circle touching for a finished working the axis 5 of the worm wheel. The openings 16 are bored in direct dependence on the theoretical globoid helix 15 and their axis are generally arranged in several rows laying in a number of plans, passing through the axis 4 of the milling head. They are secured in the body 10 in the usual manner by laterally acting screws. In FIG. 2 showing a vertical cross sectional view of the body 10 of the milling head there are four such planes I, II, III, IV in which the axis of the knives 14 are arranged. The removable knives 2, 3 are advantageously beyond said planes I to IV. The permanently clamped knives 14 have such a width, that they do not come in the course of roughing in contact with the tooth flanks which are worked by the removable knives 2, 3. If some modification of the tooth flanks is used, the cutting edges of the knives are adjusted according to these requirements, but at any case at least one point of the cutting edge 11 for roughing the tooth flanks is on the generating line 7, which is a tangent to the generating circle 1 and perpendicular to the axis of the milling head.

The described arrangement works as follows. The multiknife milling head is clamped in a machine tool for milling teeth operated on the hobbing principle, on the worktable of which the workpiece of the globoid worm wheel is fixed. The rotating speeds of the milling head and of the worm wheel are adjusted according to the transmission ratio of the required globoid worm gear. The rotating workpiece is subsequently, in the course of working, brought radially into engagement with the knives of the rotating milling head, to a distance corresponding to the correct axial distance 9 of the worm from the worm wheel. In this working phase the roughing is finished and thereafter the machine is stopped. The removable knives 2, 3 are then removed, and the workpiece receives with respect to the milling head a small circumferential turn in direction 17 and the first tooth flanks 18 of the globoid worm wheel finished by the permanently clamped knives 14. After a small turn of the workpiece with respect to the milling head in the opposite direction 20, the second tooth flanks 19 of the worm wheel are finished.

An advantage of the arrangement according to this invention is the long life of the cutting edges of the permanently clamped knives of the multiknife milling head as the removable knives perform the roughing both with the cutting edges which cut the tooth gap up to the root circle and with cutting edges, cutting the tooth flanks, which latter cutting edges comply with the theoretical position of the generating line of the gear, whereas the permanently clamped knives perform the roughing solely with cutting edges cutting the tooth gap up to the root circle, whereas the cutting edges for cutting the tooth flanks perform solely the finishing after a limited circumferential feeding motion, so that they are capable to be used for a considerable time.

The multiknife milling head according to this invention eliminates therefore, existing drawbacks as regards the shape and quality of the engaging surfaces of tooth flanks of globoid worm wheels in the course of their finishing. The thus manufactured globoid gear shows perfect engaging surfaces, smooth running, high efficiency and a possibility of full load without tedious breaking in.

The removable knives are easily sharpened to the theoretical value outside the milling head and then clamped in the milling head so that their edges coincide with a generating line of the globoid gear which is perpendicular to the rotation axis of the tool (or of the resultant worm). The permanently clamped knives are inserted similarly, their edges, however, comply with the corresponding position of the generating line. The width of these permanently clamped knives is smaller than the theoretical width of the tooth gap of the worm wheel which has to be finished with these knives. In the thus arranged milling head the cutting edges for tooth flanks of the removable knives, which are on a helical surface determining the tooth flanks, are more distant one from the other than cutting edges for tooth flanks of permanently clamped knives. In the course of roughing (that is, in the course of feeding of the tool up to the axial distance of the gear) they do not cut, as they are on a helical surface corresponding for instance, to a helical surface shifted for the supposed clearance of tooth flanks between the worm and the worm wheel. As these cutting edges do not take part in the roughing step, they are capable of use to finish the shape of the engaging surfaces of successive tooth flanks for a considerable time.

The roughing is therefore, performed by parts of all knives, but of course, only up to the moment, where the working has reached the root circle of the globoid worm wheel. The parts of teeth which are in operation out of engagement are thereby milled, with a following finishing of the tooth flanks at places of engagement, which is performed by the respective cutting edges of the permanently clamped knives. This creates perfect engaging surfaces, corresponding in shape to the globoid worm, whereby said surfaces are already worked up to a depth, corresponding to the correct engagement. A similar working of the engaging surfaces enables the reduction of the time needed to break in the gear to a significantly short time and at nominal loads and at normal efficiency. The life time of the cutting edges of the milling head used for finishing, that is of the permanently clamped knives is many times increased.

It will thus be observed that the objects aforementioned are all obtained by the present invention and that a simple efficient system is obtained to overcome the defects of the prior art. Various changes and modifications are permissable and will be obvious to those skilled in this art. It is, therefore, intended that the present description be illustrative only and not limiting of the present invention.

What is claimed:

1. A multiknife milling head for the manufacture of worm wheels comprising a body, a plurality of knives permanently clamped to said body, a pair of removable knives arranged in the body so that the positions of their cutting edges for cutting the tooth flanks coincide at least in one point with a theoretical generating line which is perpendicular to the rotation axis of the body, at least portions of the cutting edges of all knives designated for milling the teeth being located in a position corresponding to the root circle of the worked worm wheel.

2. A multiknife milling head as set forth in claim 1 wherein the position of the portions of the cutting edges of the removable knives for cutting tooth flanks coincide with the theoretical position of a generating line of the worm gear corresponding to the width of the tooth of a worm having no clearance with the teeth of the worm wheel, the position of similar parts of the permanently clamped knives coincide with generating lines corresponding to a smaller width of the teeth of the worm.

3. The apparatus according to claim 2 wherein said body has the shape of a globoid worm, said removable knives are located at the axial ends thereof, said permanently clamped knives are located about the circumferential face of said body.

4. The apparatus according to claim 3 wherein the radial extent of said removable knives from the circumference of said body exceeds that of said permanently clamped knives.

5. A method of forming globoid wheels having teeth of a defined root circle, comprising the steps of locating a rotating body adjacent a globoid workpiece, arranging on said body a first set of removable teeth and a second set of fixed teeth, the removable knives extending beyond said body a distance greater than the distance of said fixed knives, working said workpiece until said removable knives reach the root circle of the teeth, removing the removable knives and continuing working said workpiece until said fixed knives reach the root circle.

* * * * *